United States Patent [19]
Armstrong et al.

[11] Patent Number: 5,899,116
[45] Date of Patent: May 4, 1999

[54] CONNECTION FOR ENERGY-ABSORBING STEERING COLUMN

[75] Inventors: Ray Garnet Armstrong, Bay City; Richard Kremer Riefe, Saginaw, both of Mich.

[73] Assignee: General Motors Corporation, Detroit, Mich.

[21] Appl. No.: 08/986,585

[22] Filed: Dec. 8, 1997

[51] Int. Cl.⁶ ..................................................... B62D 1/19
[52] U.S. Cl. ................. 74/492; 280/777; 403/2; 188/376
[58] Field of Search ..................... 74/492, 493; 280/777; 403/2; 188/371, 376

[56] References Cited

U.S. PATENT DOCUMENTS

| | | | |
|---|---|---|---|
| 3,392,599 | 7/1968 | White | 74/492 |
| 3,394,613 | 7/1968 | Curtindale | 74/492 |
| 3,476,345 | 11/1969 | Ristau | 248/221 |
| 3,747,427 | 7/1973 | Milton et al. | 74/492 |
| 3,795,038 | 3/1974 | Brezinski et al. | 29/417 |
| 3,868,864 | 3/1975 | Durkee et al. | 74/492 |

*Primary Examiner*—Charles A Marmor
*Assistant Examiner*—William C Joyce
*Attorney, Agent, or Firm*—Saul Schwartz; Robert M. Sigler

[57] ABSTRACT

A connection between a collapsible mast jacket of an energy-absorbing steering column and a body of a motor vehicle including an outboard mounting bracket on the mast jacket having a pair of lateral flanges, a pair of open slots in the lateral flanges each having a pair of side edges interrupted by a plurality of evenly-spaced notches, a pair of capsules in the open slots rigidly clamped to the vehicle body, and a plurality of equally-spaced plastic shear pins on the capsules seated in the notches to couple the capsules to the outboard mounting bracket. Each capsule includes a capsule base having the plastic pins thereon and a separate capsule cover. The linear pitch between the plastic shear pins is the same as the linear pitch between the notches. The magnitude of the force reaction between the outboard mounting bracket and the capsules required to separate the mounting bracket from the capsules and release the mast jacket for energy-absorbing linear collapse is adjusted by varying the longitudinal overlap between the capsules and the open slots in increments equal to the linear pitches between the plastic shear pins and between the notches.

4 Claims, 3 Drawing Sheets

CONNECTION FOR ENERGY-ABSORBING STEERING COLUMN

TECHNICAL FIELD

This invention relates to a connection between a mast jacket of an energy-absorbing steering column and a body of a motor vehicle.

BACKGROUND OF THE INVENTION

U.S. Pat. No. 3,392,599, issued Jul. 16, 1968 and assigned to the assignee of this invention, describes an energy-absorbing steering column for a motor vehicle including a tubular mast jacket which collapses longitudinally through an energy-absorbing stroke in response to an impact on a manual steering wheel on the steering column. An upper or outboard connection between the mast jacket and a body of the motor vehicle includes an outboard mounting bracket on the mast jacket having a pair of lateral flanges, a pair of open slots in the lateral flanges, a pair of capsules slidably mounted in the slots and rigidly clamped to the vehicle body, and a plurality of injection molded plastic pins which couple the capsules to the lateral flanges of the outboard mounting bracket. Force attributable to the impact on the steering wheel is initially reacted to the vehicle body through the plastic pins which fracture when such impact force attains a magnitude determined by physical characteristics of the plastic pins, e.g., dimensions and material strength. When the plastic pins fracture, the capsules are uncoupled from the lateral flanges of the outboard mounting bracket, and the latter is released from the vehicle body for linear translation as a unit with the mast jacket. U.S. Pat. Nos. 3,795,038 and 3,868,864, issued Mar. 5, 1974 and Mar. 4, 1975 and assigned to the assignee of this invention, describe energy-absorbing steering columns having similar outboard connections in which the capsules are releasably retained on the outboard mounting bracket by, respectively, tangs on the bracket bent behind the capsules and by tangs on the capsules bent into notches in the bracket. U.S. Pat. No. 3,747,427, issued Jul. 24, 1973 and assigned to the assignee of this invention, describes an energy-absorbing steering column having a similar outboard connection in which the capsules are releasably retained on the outboard mounting bracket by friction between the bracket and the capsules.

SUMMARY OF THE INVENTION

This invention is a new and improved outboard connection between a longitudinally collapsible mast jacket of an energy-absorbing steering column and a body of a motor vehicle including an outboard mounting bracket on the mast jacket having a pair of lateral flanges, a pair of open slots in the lateral flanges each having a pair of side edges interrupted by a plurality of evenly-spaced notches, a pair of capsules in the open slots rigidly clamped to the vehicle body, and a plurality of equally-spaced plastic shear pins on the capsules seated in respective ones of the notches in side edges of the open slots to couple the outboard mounting bracket to the capsules. Each capsule includes a capsule base having the plastic shear pins thereon and a separate capsule cover attached to the capsule base. The linear pitch between the plastic shear pins is the same as the linear pitch between the notches in the side edges of the open slots. The magnitude of the force reaction between the outboard mounting bracket and the capsules required to separate the mounting bracket from the capsules and release the mast jacket for energy-absorbing linear collapse is adjusted by varying the longitudinal overlap between the capsules and the open slots in increments equal to the linear pitches between the plastic shear pins and between the notches in the side edges of the open slots.

DESCRIPTION OF THE PREFERRED EMBODIMENT

Figure 1:
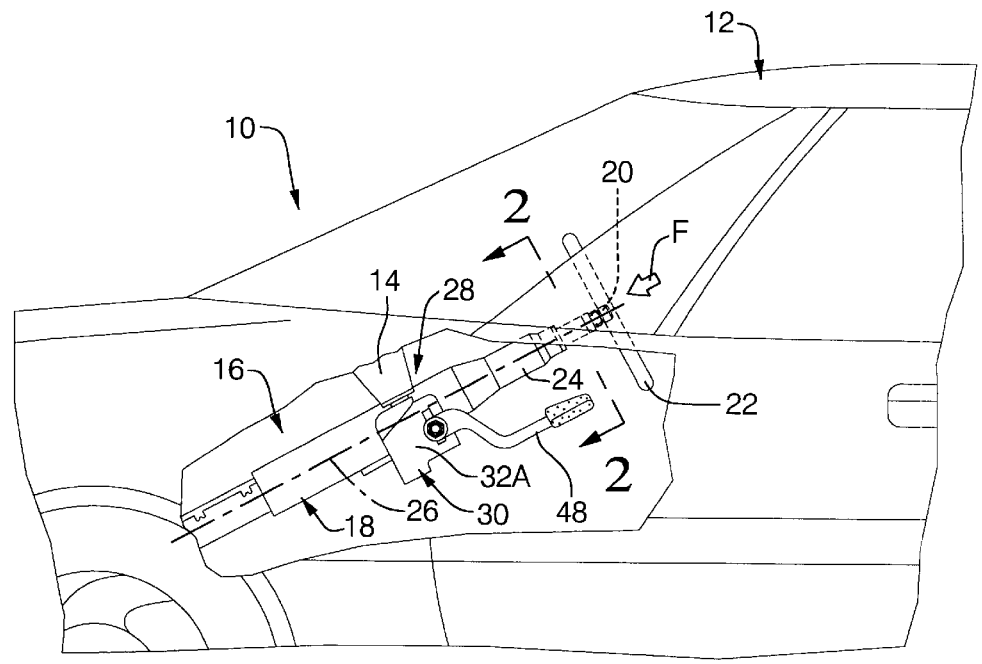
FIG. 1 is a partially broken-away elevational view of a motor vehicle body having an energy-absorbing steering column connected thereto by an outboard connection according to this invention.

Referring to FIG. 1, a motor vehicle 10 includes a body 12 having a rigid structural element 14 therein. An energy-absorbing steering column 16 such as described in the aforesaid U.S. Pat. No. 3,392,599 is disposed in the body 12 and includes a tubular mast jacket 18, a steering shaft 20 rotatably mounted on the mast jacket, and a manual steering wheel 22 on the steering shaft at an outboard end 24 of the mast jacket. A lower or inboard end, not shown, of the mast jacket 18 is connected to another structural element, not shown, of the vehicle body 12 for up and down pivotal movement of the mast jacket to adjust the vertical position of the steering wheel 22. The connection at the inboard end of the mast jacket also reacts to the vehicle body 12 forces associated with energy-absorbing linear collapse of the mast jacket in the direction of a longitudinal centerline 26 of the steering column in response to an impact on the steering wheel 22 in the direction of a vector force "F", FIG. 1. The mast jacket 18 is connected to the structural element 14 of the vehicle body 12 through an upper or outboard connection 28 according to this invention.

Figure 2:
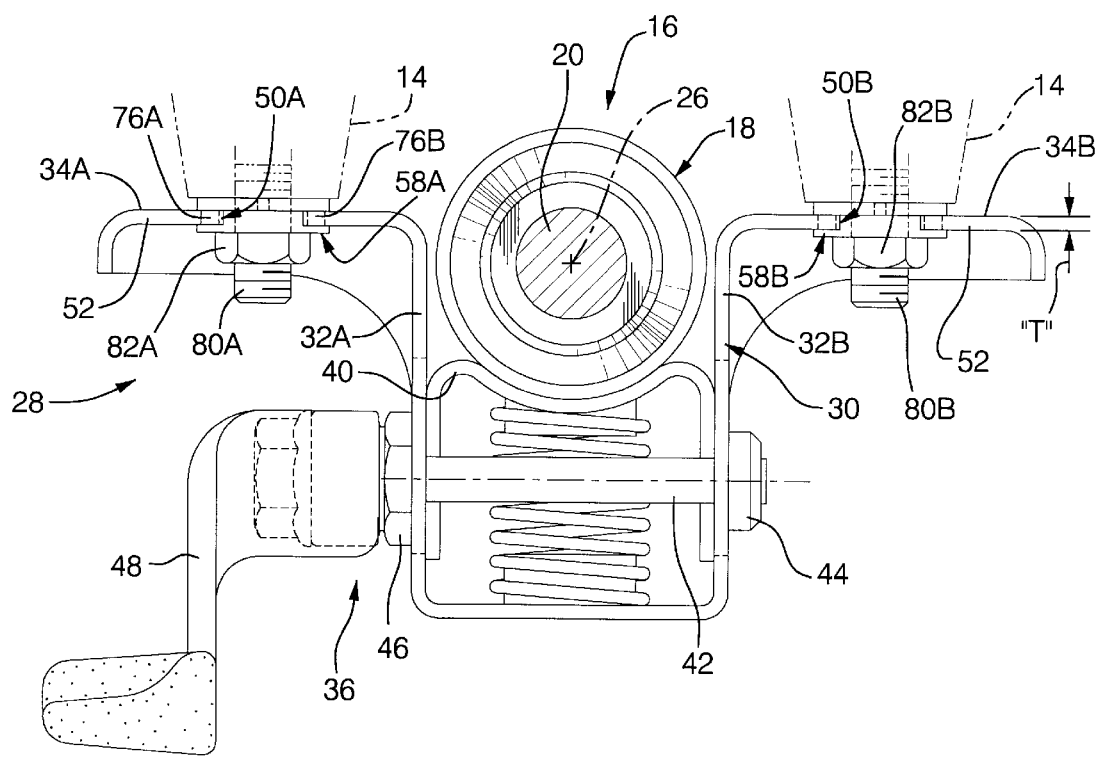
FIG. 2 is an enlarged sectional view taken generally along the plane indicated by lines 2—2 in FIG. 1.
Figure 3:
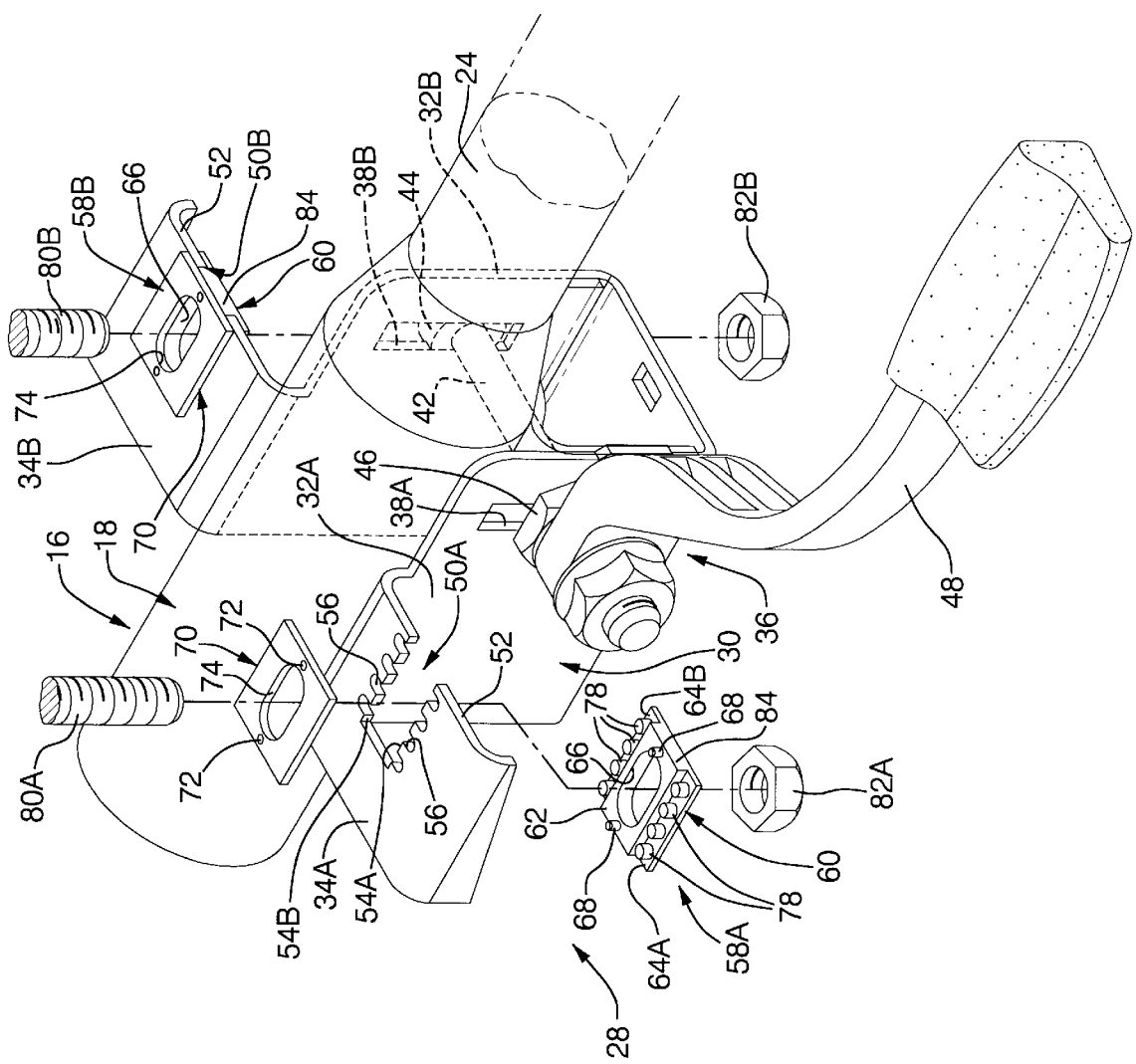
FIG. 3 is an exploded perspective view of the outboard connection according to this invention.
Figure 4:
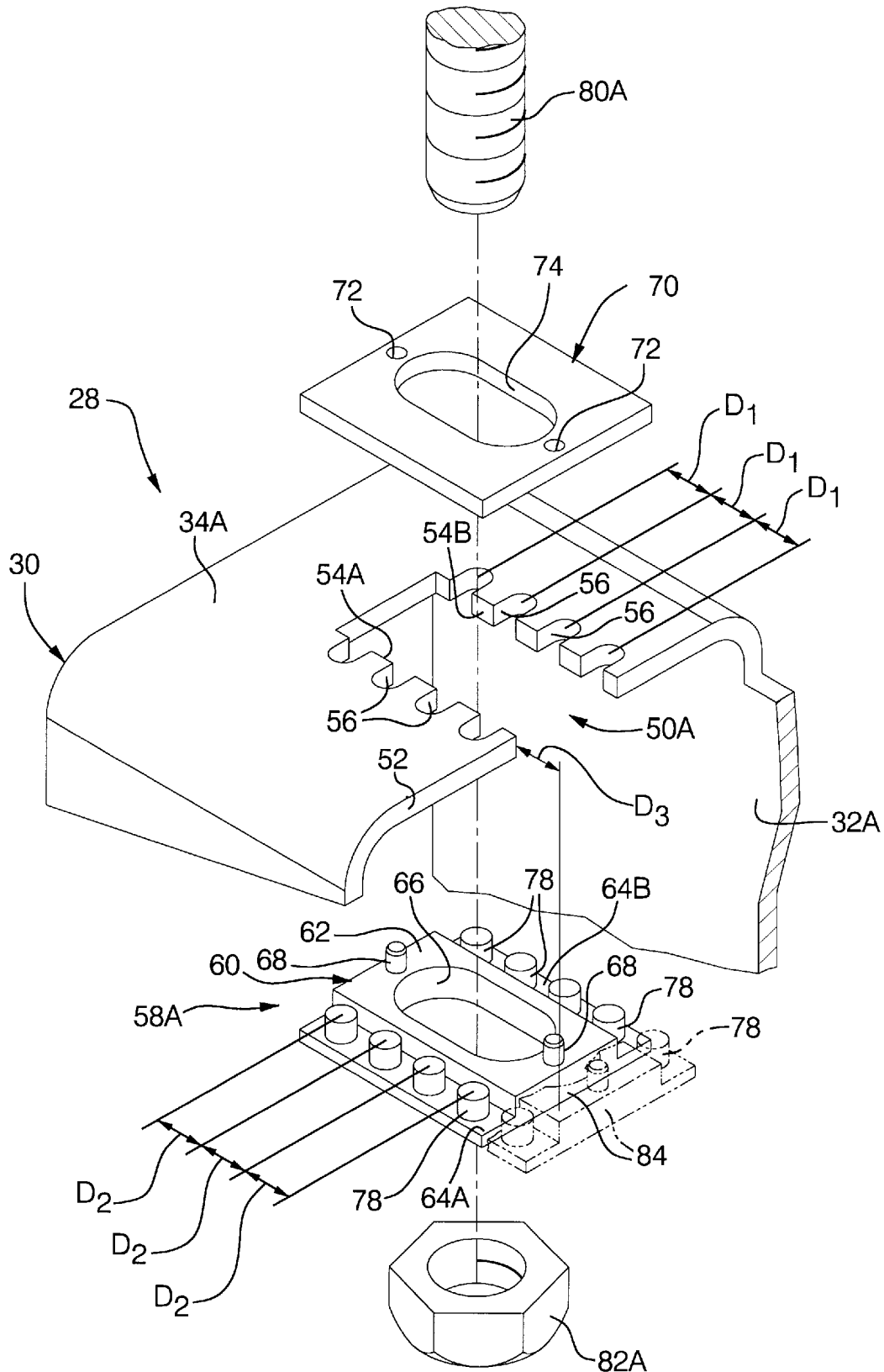
FIG. 4 is an enlarged view of a portion of FIG. 3.

As seen best in FIGS. 2–4, the outboard connection 28 includes an outboard mounting bracket 30 having a pair of vertical sides 32A, 32B on opposite sides of the mast jacket 18 and a pair of lateral flanges 34A, 34B extending in opposite directions from respective ones of the vertical sides 32A, 32B. A clamp 36 for capturing the vertical position of the mast jacket 18 relative to the structural element 14 of the vehicle body is interposed between the outboard mounting bracket 30 and the mast jacket and may have the construction described in U.S. Pat. No. 5,423,572, issued Jun. 13, 1995 and assigned to the assignee of this invention.

The clamp 36 includes a pair of vertical slots 38A, 38B in the vertical sides 32A, 32B of the outboard mounting bracket, a spacer 40 on the mast jacket 18 between the vertical sides 32A, 32B, a bolt 42 rotatably mounted on the spacer 40 and extending through the vertical slots 38A, 38B with a head 44 of the bolt outboard of the vertical side 32B and a nonrotatable nut 46 outboard of the other vertical side 32A, and a control lever 48 rotatable as a unit with the bolt. When the control lever 48 is pivoted upward to a lock position, FIG. 1, the bolt squeezes the vertical sides 32A, 32B of the outboard mounting bracket 30 against the spacer 40 to frictionally couple the mast jacket 18 to the outboard mounting bracket. When the control lever is pivoted down to a release position, not shown, the mast jacket is released for up and down pivotal movement.

Referring to FIGS. 2–4, the outboard connection 28 further includes a pair of slots 50A, 50B in respective ones of the lateral flanges 34A, 34B each open toward the outboard end 24 of the mast jacket 18 through an edge 52 of the corresponding one of the lateral flanges. Each open slot 50A, 50B has a pair of side edges 54A, 54B parallel to the longitudinal centerline 26 of the steering column. Each of the side edges 54A, 54B is interrupted by a plurality of notches 56 separated from each other by equal linear pitch dimensions "$D_1$", FIG. 4, in the direction of the longitudinal centerline 26 of the steering column.

A pair of identical capsules 58A, 58B are disposed in respective ones of the open slots 50A, 50B. A capsule base 60 of each capsule 58A, 58B has a planar top surface 62, a pair of linear shoulders 64A, 64B along respective ones of a pair of side edges of the capsule base, an aperture 66 elongated parallel to the linear shoulders 64A, 64B, and a pair of studs 68 perpendicular to the planar top surface 62. A flat capsule cover 70 of each capsule 58A, 58B has a pair of sockets 72 therein for receiving respective ones of the studs 68 and an elongated aperture 74 matching the elongated aperture 66 in the capsule base.

The capsule cover 70 overhangs each of the linear shoulders 64A, 64B on the capsule base 60 and cooperates therewith in defining a pair of C-shaped side channels 76A, 76B, FIG. 2, on the capsule in which the side edges 54A, 54B of the corresponding one of the open slots 50A, 50B are captured perpendicular to the lateral flanges 34A, 34B. The depth of the side channels 76A, 76B corresponds to a thickness dimension "T", FIG. 2, of the lateral flanges to minimize vertical lash between the capsules 58A, 58B and the outboard mounting bracket.

As seen best in FIGS. 3–4, a plurality of plastic shear pins 78 are rigidly attached to the capsule base 60 in each of the side channels 76A, 76B of the capsule perpendicular to the linear shoulders 64A, 64B. The plastic shear pins 78 may be molded integrally with the capsule base where the latter is constructed from a plastic such as nylon 66 or they may be molded separately and rigidly attached to the capsule base by conventional techniques. The plastic shear pins 78 are separated from each other by equal linear pitch dimensions "$D_2$", FIG. 4, in the direction of the linear shoulders 64A, 64B. The linear pitch dimensions $D_2$ are equal to the linear pitch dimensions $D_1$ between the notches in the side edges 54A, 54B of the open slots 50A, 50B. The height of the plastic shear pins 78 above the linear shoulders 64A, 64B corresponds to the depth of the side channels 76A, 76B.

The capsule bases 60 are installed in corresponding ones of the open slots 50A, 50B from below the lateral flanges 34A, 34B separately from the capsule covers 70 with the plastic shear pins 78 being lodged in respective ones of the notches 56 in the side edges 54A, 54B of the open slots. The capsule covers 70 seat on the top surfaces 62 of the capsule bases from above the lateral flanges with the studs 68 being received in the sockets 72 and with the elongated apertures 74 in register with the elongated apertures 66 in the capsule bases. The capsule covers may be retained by fasteners, not shown, on the studs 68 or by staking, heading or otherwise expanding the studs behind the capsule covers. The plastic shear pins 78 substantially fill the notches 56 to minimize lash in the plane of the lateral flanges 34A, 34B between the capsules 58A, 58B and the outboard mounting bracket.

A pair of vertical hangers 80A, 80B of the outboard attachment 28 are rigidly attached to the structural element 14 of the body 12 of the motor vehicle and protrude down through the aligned elongated apertures 66, 74 in corresponding ones of the capsules 58A, 58B. The capsules are rigidly and permanently clamped to the structural element 14 of the vehicle body by respective ones of a pair of fasteners 82A, 82B on the hangers 80A, 80B below the capsules. The hangers 80A, 80B cooperate with the capsules 58A, 58B in supporting the outboard end 24 of the mast jacket 18 on the body 12 of the motor vehicle with substantially zero lash perpendicular to the lateral flanges 34A, 34B and in the plane of the lateral flanges.

With the control lever 48 in its locked position, the force of the impact on the steering wheel 22 in the direction represented by the force vector "F", FIG. 1, is initially reacted from the mast jacket 18 to the outboard mounting bracket 28 through the clamp 36. Such force urges the lateral flanges 34A, 34B to slide out of the side channels 76A, 76B of the capsules 58A, 58B in the direction of the longitudinal centerline 26 of the steering column but is resisted by the plastic shear pins 78 in the notches 56. The resistance afforded by the plastic pins is sustained until the impact force attains a magnitude sufficient to fracture concurrently all of the plastic pins, whereupon the outboard mounting bracket 30 is released from the capsules 58A, 58B and slides out of the side channels 76A, 76B thereof concurrent with energy-absorbing linear collapse of the mast jacket 18 in the direction of the longitudinal centerline 26 of the steering column.

The equal linear pitch dimensions $D_1$, $D_2$ between the notches 56 and between the plastic shear pins 78 is an important feature of this invention which permits the magnitude of the impact force required to initiate release of the outboard mounting bracket 30 from the structural element 14 of the vehicle body to be adjusted for different motor vehicle applications. More particularly, the magnitude of the impact force required to initiate release of the outboard mounting bracket 30 from the structural element 14 is the sum of the magnitudes of forces required to fracture separately each of the plastic shear pins 78 lodged in the notches 56 and is, therefore, directly proportional to the number of plastic shear pins on each capsule that are lodged in the notches. Because the linear pitch dimensions $D_1$, $D_2$ are equal, the number of plastic shear pins 78 on each capsule that are lodged in the notches 56 can be varied simply by varying the magnitude of the longitudinal overlap between the capsules 58A, 58B and the open slots 50A, 50B as represented by a dimension "$D_3$", FIG. 4, between the edge 52 of the corresponding lateral flange 34A, 34B and an end 84 of each capsule base 60.

For example, the dimension $D_3$ is zero when the capsules 58A, 58B completely fill the open slots 50A, 50B as illustrated in FIGS. 1–4. In that circumstance, the maximum number of plastic shear pins 78 on the capsules are lodged in the notches 56 in the lateral flanges 34A, 34B and the magnitude of the impact force required to initiate release of the outboard mounting bracket 30 from the structural element 14 of the vehicle body is, accordingly, also maximum. As the dimension $D_3$ increases from zero in increments equal to the linear pitch dimensions $D_1$, $D_2$ as schematically represented in broken lines in FIG. 4, the number of plastic shear pins 78 on each of the capsules lodged in the notches 56 decreases by two for each incremental step so that the magnitude of the impact force required to initiate release of the outboard mounting bracket 30 from the structural element 14 incrementally decreases. The elongated apertures 66, 74 in the capsule bodies and in the capsule covers must, of course, be long enough to avoid interference between the vertical hangers 80A, 80B and the ends of the apertures as the dimension $D_3$ increases.

Having thus described the invention, what is claimed is:

1. A connection between a body of a motor vehicle and a mast jacket of an energy-absorbing steering column linearly collapsible in the direction of a longitudinal centerline of said steering column comprising:

a mounting bracket on said steering column having a lateral flange, an open slot in said lateral flange having a pair of side edges parallel to said longitudinal centerline of said steering column, a plurality of notches in each of said pair of side edges of said open slot evenly separated from each other by a linear pitch dimension, a capsule having a pair of side channels and a plurality of plastic shear pins in each of said pair of side channels evenly separated from each other by said linear pitch dimension, means operative to mount said capsule in said open slot with each of said pair of side channels thereof slidably receiving a corresponding one of said pair of side edges of said open slot and with said plastic shear pins lodged in said notches in each of said pair of side edges of said open slot, said linear pitch dimension between said notches in each of said pair of side edges of said open slot and between each of said plastic shear pins accommodating a plurality of discrete longitudinally overlapping positions of said capsule relative to said open slot separated by said linear pitch dimension to vary the number of said plastic shear pins lodged in said notches in each of said pair of side edges of said open slot and the magnitude of a force required to separate said mounting bracket from said capsule by fracturing concurrently the ones of said plastic shear pins lodged in said notches in each of said side edges of said open slot, and means operative to rigidly clamp said capsule to said body of said motor vehicle.

2. The connection between a body of a motor vehicle and a mast jacket of an energy-absorbing steering column recited in claim 1 wherein said means operative to mount said capsule in said open slot with each of said pair of side channels thereof slidably receiving a corresponding one of said pair of side edges of said open slot and with said plastic shear pins lodged in said notches in each of said pair of side edges of said open slot comprises:

a capsule base having a planar top surface and a pair of linear shoulders along a pair of side edges of said capsule base, said plastic shear pins being rigidly attached to said capsule base on each of and perpendicular to said pair of linear shoulders and said capsule base being installed in said open slot from a first side of said lateral flange, a flat capsule cover seated on said planar top surface of said capsule base from a second side of said lateral flange and overlapping each of said pair of linear shoulders on said capsule base and cooperating therewith in defining each of said pair of side channels on said capsule, and means operative to rigidly attach said flat capsule cover to said capsule base.

3. The connection between a body of a motor vehicle and a mast jacket of an energy-absorbing steering column recited in claim 2 wherein said means operative to rigidly clamp said capsule to said body of said motor vehicle comprises:

a slot in said capsule base elongated in the direction of said longitudinal centerline of said steering column, a slot in said capsule cover elongated in the direction of said longitudinal centerline of said steering column and registering with said elongated slot in said capsule base, a vertical hanger protruding through each of said elongated slots in said capsule base and in said capsule cover rigidly attached to a structural element on said body of said motor vehicle, and a fastener on said vertical hanger on the opposite side of said capsule from said structural element on said body of said motor vehicle.

4. The connection between a body of a motor vehicle and a mast jacket of an energy-absorbing steering column recited in claim 3 wherein:

each of said plastic shear pins is molded integrally with said capsule base.

* * * * *